United States Patent
Strauss et al.

(10) Patent No.: US 7,259,722 B2
(45) Date of Patent: Aug. 21, 2007

(54) ANTENNA COUPLER AND MOUNT FOR MOBILE RADIO TERMINALS

(75) Inventors: Karsten Strauss, Crailsheim (DE); Thomas Schlegel, Nuremberg (DE)

(73) Assignee: Audioton Kebelwerk GmbH Zweigniederlassung Scheinfeld (DE)

( * ) Notice: Subject to any disclaimer, the term of this patent is extended or adjusted under 35 U.S.C. 154(b) by 70 days.

(21) Appl. No.: 10/550,138

(22) PCT Filed: Nov. 11, 2003

(86) PCT No.: PCT/DE03/03766

§ 371 (c)(1), (2), (4) Date: Sep. 21, 2005

(87) PCT Pub. No.: WO2004/086558

PCT Pub. Date: Oct. 7, 2004

(65) Prior Publication Data

US 2007/0008233 A1    Jan. 11, 2007

(30) Foreign Application Priority Data

Mar. 25, 2003   (DE) ............................... 103 13 498

(51) Int. Cl.
*H01Q 1/24* (2006.01)
*H01Q 1/32* (2006.01)
*H01Q 1/50* (2006.01)

(52) U.S. Cl. ................ 343/702; 343/713; 343/906
(58) Field of Classification Search ........... 343/711, 343/713, 702, 906
See application file for complete search history.

(56) References Cited

U.S. PATENT DOCUMENTS

| 5,668,561 | A |   | 9/1997 | Perrotta et al. |
| 5,852,421 | A | * | 12/1998 | Maldonado ................. 343/702 |
| 5,920,293 | A | * | 7/1999 | Perrotta et al. ............. 343/906 |
| 6,134,421 | A |   | 10/2000 | Lee et al. |
| 2001/0001343 | A1 |   | 5/2001 | Logothetis |
| 2004/0204187 | A1 | * | 10/2004 | Nevermann .............. 455/575.1 |

FOREIGN PATENT DOCUMENTS

| DE | 199 15 246 A 1 | 10/2000 |
| DE | 100 37 241 A 1 | 2/2002 |
| EP | 0 766 339 A2 | 4/1997 |
| EP | 0 999 607 A2 | 5/2000 |

\* cited by examiner

*Primary Examiner*—Shih-Chao Chen
(74) *Attorney, Agent, or Firm*—Fulbright & Jaworski; Jan K. Simpson (57) ABSTRACT

The invention relates to a holder for a mobile radio terminal and an antenna coupler for a mobile radio terminal. The holder is provided with an interface for connection of an external antenna, in particular of a motor vehicle antenna, and with a coupling structure for electromagnetic coupling of RF signals between the holder and the antenna of a mobile radio terminal which is located in the holder. The coupling structure is arranged in the holder in such a way that, when the mobile radio terminal is inserted, the coupling structure is positioned in the vicinity of the mobile radio terminal. The coupling structure is in the form of a two-layer or multilayer coupling structure with two or more coupling structure elements arranged one above the other.

13 Claims, 6 Drawing Sheets

ANTENNA COUPLER AND MOUNT FOR MOBILE RADIO TERMINALS

CROSS-REFERENCE TO RELATED APPLICATIONS

This application is a national stage application of PCT/DE2003/003766 filed Nov. 11, 2003 claiming priority to DE 103 13 498.0 filed Mar. 25, 2003.

TECHNICAL FIELD

The invention relates to an antenna coupler for mobile radio terminals which is provided with an interface for connection of an external antenna, in particular a motor vehicle antenna, and a coupling structure for electromagnetic coupling of RF signals between the antenna coupler and the antenna of a mobile radio terminal which is located in the vicinity of the antenna coupler. The invention also relates to a holder for a mobile radio terminal, which is provided with an interface for connection of an external antenna, in particular of a motor vehicle antenna, and with a coupling structure for electromagnetic coupling of RF signals between the holder and the antenna of a mobile radio terminal which is located in the holder, and in which the coupling structure is arranged in the holder in such a way that, when the mobile radio terminal is inserted, the coupling structure is positioned in the vicinity of the mobile radio terminal.

BACKGROUND OF THE INVENTION

Nowadays, a very wide range of variations and embodiments of mobile radio terminals are available. Some of these mobile radio terminals are not equipped with an antenna socket for connection of an external antenna.

In order to make it possible to operate these mobile radio terminals with an external antenna despite this, antenna couplers are known which allow electromagnetic coupling of RF signals between the antenna coupler and the antenna of the mobile radio terminal.

By way of example, DE 10 037 241 A1 describes a holder for a cellular telephone for installation in a passenger compartment of a motor vehicle, which holder is equipped with a coupling antenna. This coupling antenna allows capacitive coupling of the RF signal between the antenna of the mobile radio terminal and the holder for the cellular telephone when the mobile radio terminal is inserted. A connecting line connects the coupling antenna to an external antenna. The holder for a cellular telephone has an attachment element, for example a magnet, which holds the mobile radio terminal in the holder for a cellular telephone.

In this case, the coupling antenna comprises a dipole structure with an electrical length of λ/4, which is composed of metal or of an electrically highly conductive plastic and is angled. In this case, at least part of the coupling antenna runs in a holding element on the upper face of the holder for a cellular telephone, so that not only are those RF signals which are emitted laterally from the mobile radio antenna injected, but also the RF signals which are emitted upwards. This improves the transmission quality of the RF signals.

DE 19 953 648 A1 describes a modular dual-band planar coupler for coupling an external antenna to a mobile radio terminal. This antenna coupler comprises a conductive plate or foil with a conductive structure which is in the form of a slot, which are composed of one or more conductive waveguide segments in the form of slots, with the inner conductor and the outer conductor of a coaxial waveguide each being conductively connected to the conductive plate or foil on the opposite edges of the slotted conductor. The axis of the inner conductor is in this case guided orthogonally with respect to the normal to the surface of the conductive plate or foil, and at right angles to the axis of the slotted conductor. The structured conductive plate or foil is arranged without making any conductive contact and parallel to the surface of the system-integrated object antenna element and above the antenna element apparatus of the object antenna element.

Furthermore, antenna couplers in the form of coils or metal eyes are known, which are fitted to the antenna of a mobile telephone.

The invention is now based on the object of connecting a mobile radio terminal which is not equipped with an antenna socket to an external antenna, and of keeping the coupling loss as small as possible in the process.

BRIEF SUMMARY OF THE INVENTION

This object is achieved by an antenna coupler for mobile radio terminals which is provided with an interface for connection to an external antenna, in particular a motor vehicle antenna, and with a coupling structure for electromagnetic coupling of RF signals between the antenna coupler and the antenna of a mobile radio terminal which is located in the vicinity of the antenna coupler, in which the coupling structure is in the form of a two-layer or multilayer coupling structure with two or more coupling structure elements arranged one above the other. The invention also relates to a holder for mobile radio terminals which is provided with an interface for connection to an external antenna, in particular a motor vehicle antenna, and having a coupling structure for electromagnetic coupling of RF signals between the holder and the antenna of a mobile radio terminal which is located in the holder, with the coupling structure being arranged in the holder in such a way that, when the mobile radio terminal is inserted, the coupling structure is positioned in the vicinity of the mobile radio terminal, and the coupling structure is in the form of a two-layer or multilayer coupling structure with two or more coupling structure elements arranged one above the other.

The invention provides particularly low-loss electromagnetic coupling between typical internal antennas of mobile radio terminals which have a pronounced direction characteristic and are generally operated in two or more different frequency bands (dual-band, tri-band) and external antennas. Investigations have shown that coupling structure elements which are arranged physically one behind the other in this way make it possible to greatly reduce coupling losses even when the individual coupling structure elements have a planar configuration. The invention is in this case based on the discovery that, in the specific conditions of this field of application (antenna and coupler arranged very close to one another, strong directional characteristic of the mobile radio antenna, operation in two or more frequency bands, frequency bands being used) a spatial arrangement of a plurality of coupling structures arranged one behind the other improves the electromagnetic coupling and thus makes it possible to reduce the coupling loss. It has been found that a spatial arrangement of two or more coupling structure elements such as this makes it possible to inject greater field components into the coupling structure than in the case of planar antenna coupling structures, even when the distance between the coupling structures is in a range in which impedance-transforming characteristics are not achieved, as a result of the separation.

This results in the following particular advantages when used within vehicles:

The field strength within the vehicle is reduced. The shielding effect of the vehicle bodywork means that the mobile radio terminal would have to be operated at a higher power level without the use of the invention. This therefore avoids considerably higher field strengths occurring, due to resonance effects, than in the open air (that is to say outside the vehicle). Furthermore, the electrical field which is produced by the mobile radio terminal also affects the electronics located in the vehicle, and can lead to interference with such electronics. Furthermore, this avoids a reduction in the cell size of radio cells. The radiation field of a mobile radio terminal is also normally highly disturbed by the effects of the bodywork. The invention thus reduces the probability of the occurrence of a reception hole with the consequence of reduced speech quality, possibly up to connection termination or non-accessibility.

Advantageous refinements of the invention are specified in the dependent claims.

It has been found to be particularly advantageous for the two or more coupling structure elements to be arranged at a distance from one another and on essentially mutually parallel planes. The coupling structure elements are in this case preferably arranged one above the other at a distance of three to six millimeters from one another. An arrangement such as this is on the one hand particularly well matched to the emission characteristic of mobile radio terminals and to the frequency bands used by mobile radio terminals, and on the other hand can be manufactured easily and at low cost.

Further advantages are obtained in this case when the two or more coupling structure elements are oriented one behind the other essentially at right angles to the main emission direction of the mobile radio terminal. This makes it possible to increase the proportion of the field components which can be injected.

Furthermore, the proportion of the field components which can be injected can be increased by arranging the coupling structure elements as far away from one another as possible within the scope of the space which is available in the holder. For example, a first coupling structure element is thus arranged in the immediate vicinity of the upper face of the holder, and a second coupling structure element is arranged in the immediate vicinity of the lower face of the holder.

It is also advantageous to separate the coupling structure elements by fractions of the wavelength, in particular $\lambda/4$ or more, and thus to make use of additionally created impedance-transforming characteristics of the coupling structure. In order to improve the matching to two or more frequency bands which are used by the mobile radio terminal, it is in this case advantageous to use three, four or more coupling structure elements, which are each appropriately separated from one another.

A particularly low coupling loss can be achieved in two or more different frequency ranges by one coupling structure element being composed of two or more differently shaped structure elements which are intended for different wavelength ranges. In this case, when using two such structure elements, it has been found to be advantageous for one coupling structure element to be formed from two structure elements whose orientation directions are rotated through 90°. According to a further preferred exemplary embodiment of the invention, it is also possible to optimize different coupling structure elements for different wavelength ranges.

It is expedient to produce one coupling structure element from a conductive material which is applied to one face of a mount substrate, in particular of a board. It is also possible to apply two or more structure elements composed of a conductive material to the mount material and to connect one or more of these structure elements to one another by means of capacitors or coils in order to match the antenna coupler to a specific mobile radio terminal. A procedure such as this results in advantages in production: the mount substrate with the two or more structure elements can be produced in greater quantities for different mobile radio terminal types, since the coupling structure element which is in each case used for one specific mobile radio terminal type can be individually matched to the particular emission characteristic of this mobile radio terminal type. This results in a solution which links low production costs with low coupling loss.

According to one preferred exemplary embodiment of the invention, the two or more coupling structure elements are composed of a conductive material which is applied to a respectively associated thin dielectric mount substrate body, with the dielectric mount substrate bodies being arranged one above the other at a distance from one another. For example, the coupling structure may comprise two or more boards which are arranged one above the other and on each of which conductive surfaces coupling structure elements are provided. This results in an antenna coupler which can be produced easily from the production point of view and has a low coupling loss. Further advantages can be achieved by the antenna coupler having one or more electrical connecting elements, which are arranged between mount substrate bodies. Coupling structure elements or structure elements of coupling structure elements are coupled to one another by means of these electrical connecting elements.

The electrical connecting elements preferably each have one or more electrically conductive contact elements which are mounted in a sprung form and engage on correspondingly shaped contact surfaces. This on the one hand simplifies assembly, while on the other hand increasing the operational reliability and life of the antenna coupler. This results in advantages in particular in the motor vehicle field, since vibration and major temperature fluctuations act on the antenna coupler when the holder is installed in a motor vehicle.

It has also been found to be advantageous to arrange an RF coupling element on a first mount substrate in order to couple two or more structure elements of a coupling structure element which are applied to a second mount substrate body. This makes it possible to match the characteristic impedance of the antenna coupler more precisely.

It is also expedient to produce the mount substrate body from a flexible material. It has been found to be advantageous for the uppermost coupling structure element, which is located closest to the mobile radio terminal, to be arranged as close as possible to the antenna of the mobile radio terminal. If the mount substrate body of this coupling structure element is produced from a flexible material, then the mount substrate body can be merged with the shape of the mobile radio terminal so that the distance between the antenna of the mobile radio terminal and this coupling structure element is very short.

These advantages can also be achieved by the uppermost coupling structure element being connected to the housing of the holder, in particular by adhesive bonding. The uppermost coupling structure element can in this case be arranged on the outside of the housing of the holder or on the inner face of the housing of the holder. The arrangement on the inner face of the housing in this case has the advantage that the failure probability of the antenna coupler is reduced, and the life of the antenna coupler is increased. In this case, it is advantageous for the uppermost coupling structure element to be arranged on the inner face of the housing of the holder in the immediate vicinity of the antenna of the mobile radio terminal.

Further advantages can be obtained from the mount substrate body having one or more internal milled areas which are arranged between the conductor surfaces of the coupling structure element. The capability to tune the antenna coupler is improved by removal of dielectric material.

BRIEF DESCRIPTION OF THE DRAWINGS

The invention will be explained by way of example in the following text with reference to a number of exemplary embodiments and with reference to the attached drawings, in which.

DETAILED DESCRIPTION OF THE INVENTION

Figure 1:
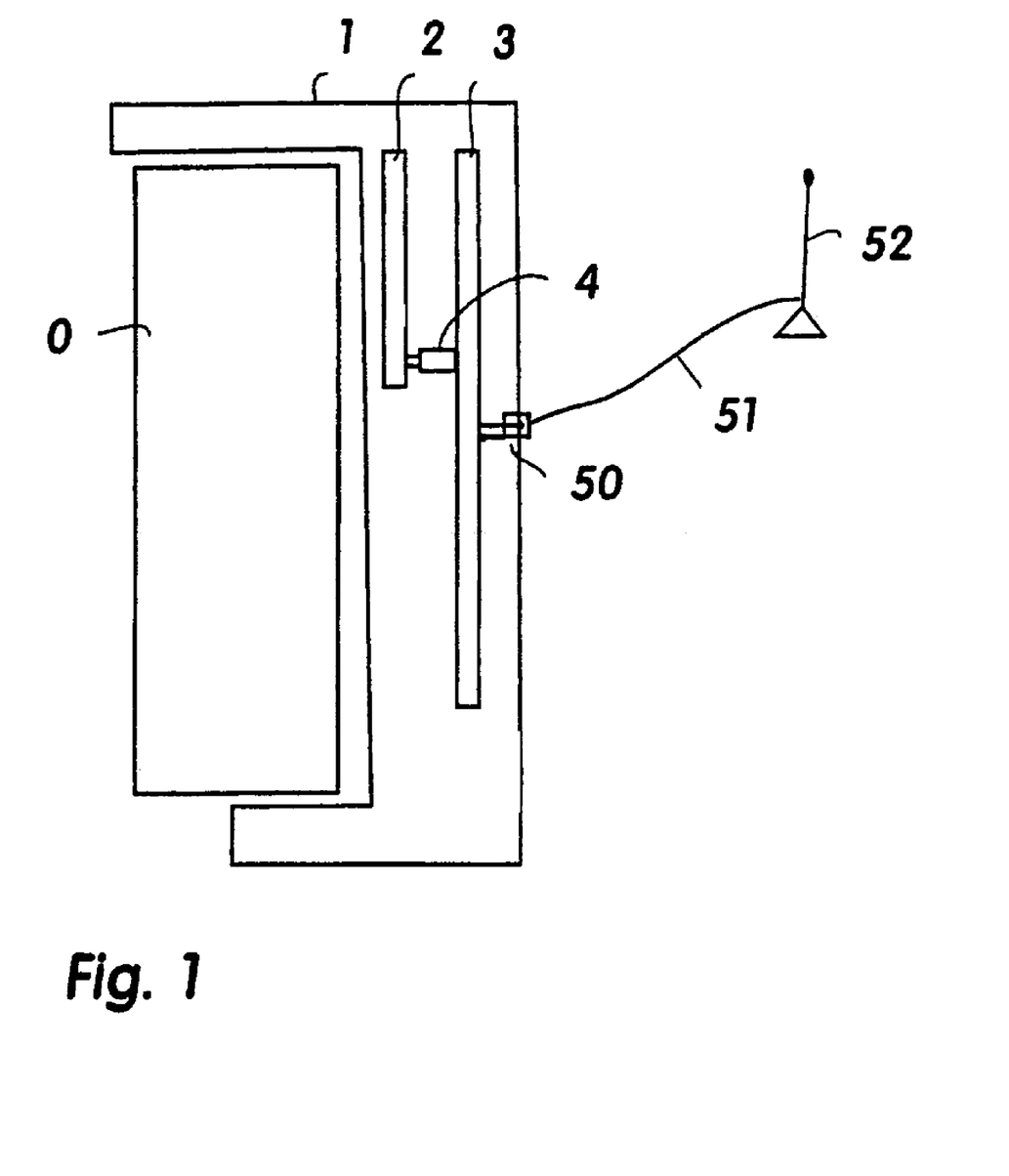
FIG. 1 shows a schematic illustration of a holder according to the invention for a mobile radio terminal having an antenna coupler according to the invention.

FIG. 1 shows a holder 1, an antenna coupler formed from two coupling structure elements 2 and 3 and an electrical connecting element 4, an interface unit 50, a connecting cable 51, an external antenna 52 and a mobile radio terminal 0.

The mobile radio terminal 0 may be one of the mobile radio terminals from different manufacturers which can also operate on the basis of different mobile radio standards. For example, these may be GSM terminals (GSM=Global System for Mobile Communication) or UMTS terminals (UMTS=Universal Mobile Telecommunications System). The mobile radio terminal 0 is preferably in this case a mobile radio terminal which can communicate using two or more frequency bands.

The holder 1 is designed such that it can mechanically hold a mobile radio terminal as described above. In addition to purely mechanical retention, it is advantageous for the holder 1 to have a holding apparatus which fixes the mobile radio terminal within the holder. By way of example, this holding apparatus may be a magnet, a holding bracket or an element which produces a mechanical clamping effect.

It is also advantageous for the holder 1 to have a connecting element which engages in an interface on the mobile radio terminal 0 when the mobile radio terminal 0 is inserted in the holder 1 to its limit position. By way of example, this interface may be a control interface and/or an interface for an external power supply.

The holder 1 is also designed such that it is suitable for installation in motor vehicles. By way of example, it may have appropriate cutouts for this purpose, by means of which it can be connected to the motor vehicle via attachment means. It is also furthermore possible for the holder 1 to be designed in two parts. On the one hand, it may have a holding apparatus which is mechanically and/or electrically matched to the specific mobile radio terminal and in which the antenna coupler is also integrated. On the other hand, it may also have a base part which can be mechanically connected to the motor vehicle. In this case, a standard mechanical and/or electrical connection can be provided between the holding apparatus and the base part, so that different holding apparatuses for different mobile radio terminal types can be mechanically and/or electrically connected to one and the same base part.

It is, of course, also possible for the holder 1 to be usable for other fields of application as well.

The antenna coupler is connected to the interface device 50 via connecting lines. By way of example, the interface device 50 is a connecting socket for connection of a coaxial cable. However, the interface device 50 may also be a simple conductive connection. The connecting cable 51 connects the interface device 50 to the external antenna 52. The external antenna 52 is, for example, the external antenna of a motor vehicle. However, the external antenna 52 may also be an antenna which is arranged within the motor vehicle and, for example, is fitted in the area of the window surface.

It is also possible to dispense with the interface device 50 and to connect the connecting cable 51 directly to the antenna coupler 1, for example by soldering it to the coupling structure element 3.

In addition to the antenna coupler, the holder 1 may also contain further assemblies which, for example, provide functions for a hands-free device, a navigation system, etc. For this purpose, the holder 1 may also have input and output means, for example microphones, loudspeakers, displays, etc.

The coupling structure elements 2 and 3 are each composed of a conductive material which is applied to one face of a thin mount substrate, in particular of a board. It is also possible to dispense with the mount substrate in this case by forming the coupling structure element from a conductive material of a thickness to provide sufficient mechanical robustness.

The two coupling structure elements 2 and 3 are arranged on essentially mutually parallel planes and are separated from one another by about 3.5 mm. The distance between the coupling structure elements 2 and 3 may in this case be varied as a function of the mobile radio terminal that is used and the dielectric constants of the mount materials that are used, as well as the distance between the coupling structure element 2 and the antenna of the mobile radio terminal 0. Investigations have shown that it is preferable to arrange the coupling structure elements 2 and 3 at a distance of more than 3 mm from one another.

Figure 2:
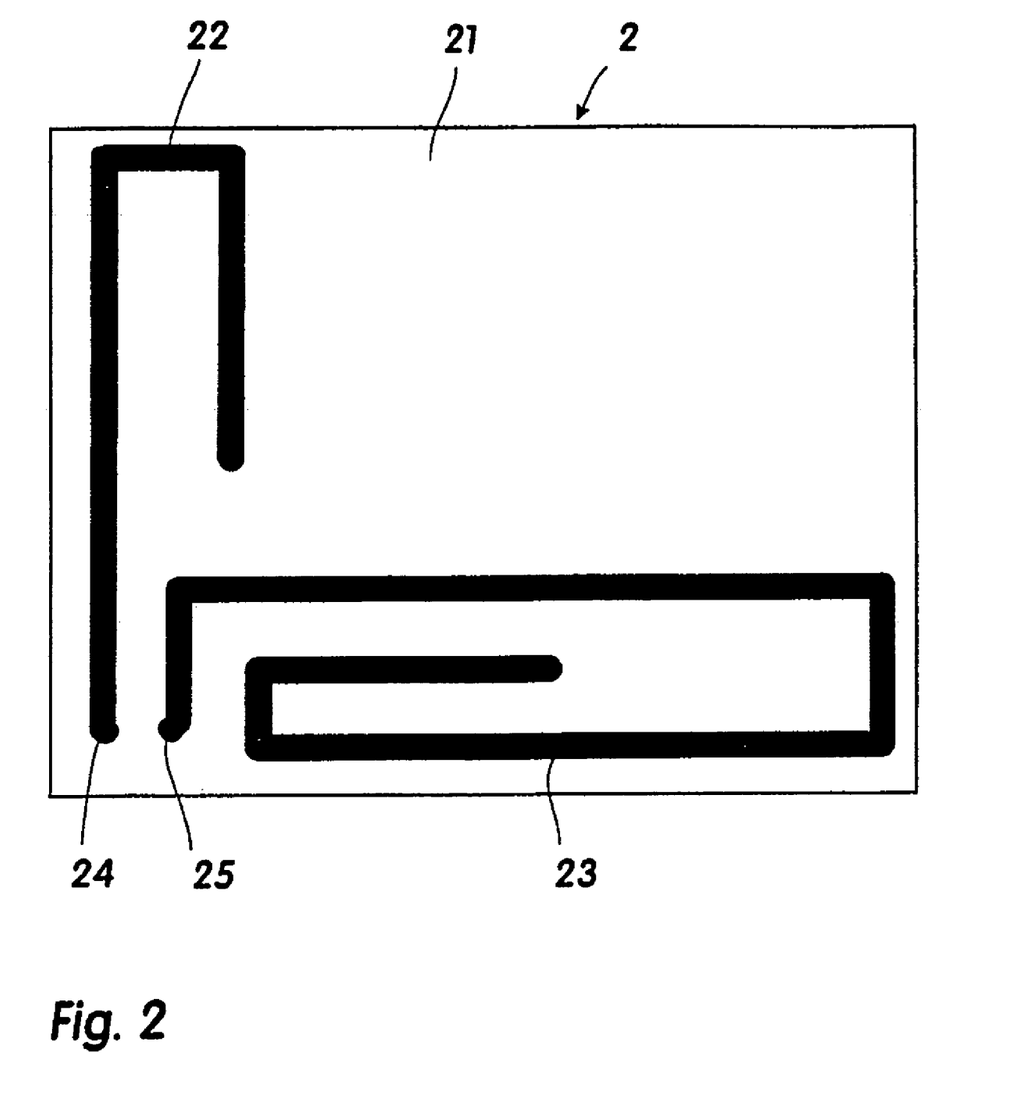
FIG. 2 shows a plan view of a coupling structure element for the antenna coupler as shown in FIG. 1.
Figure 3:
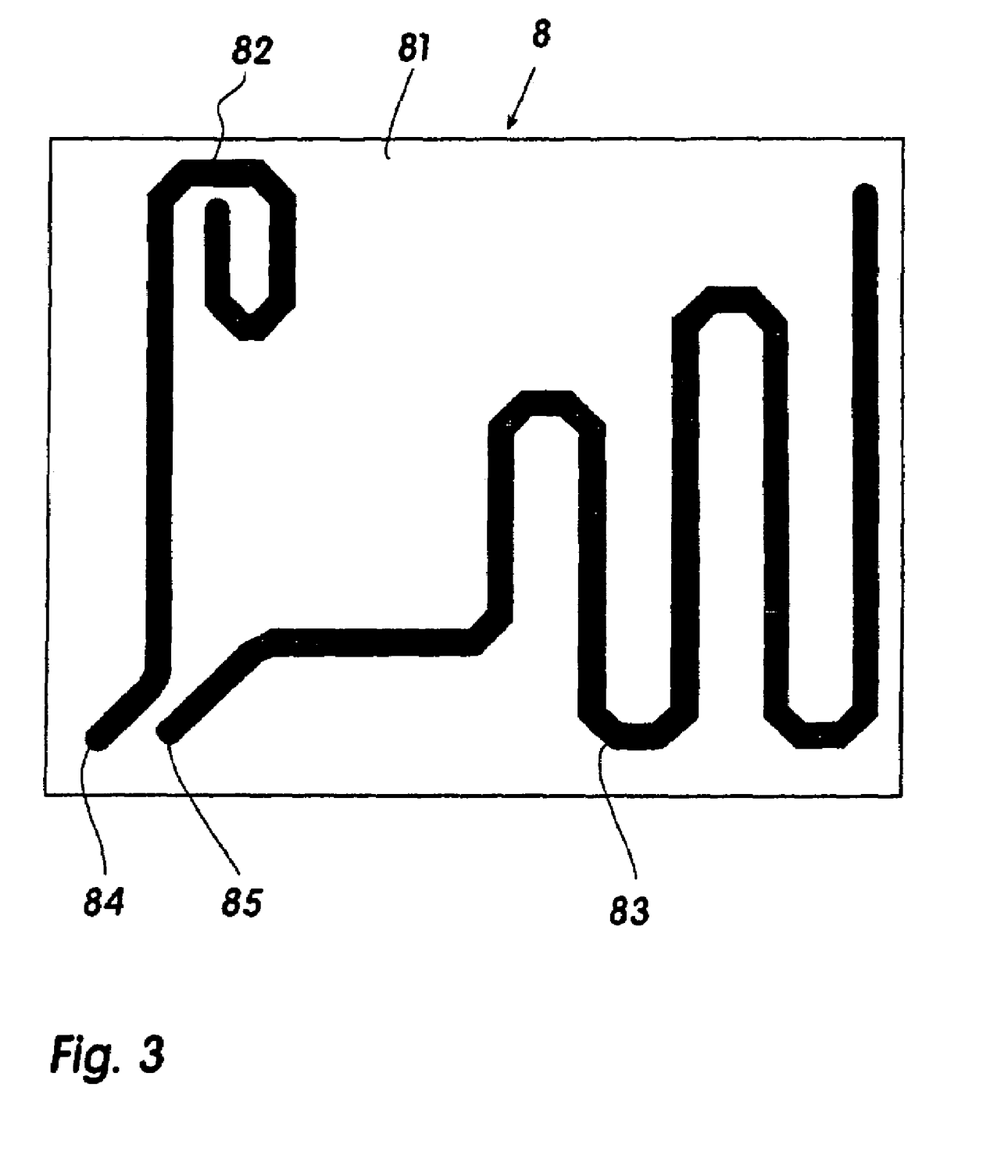
FIG. 3 shows a plan view of a coupling structure element for an antenna coupler as shown in FIG. 1.
Figure 4:
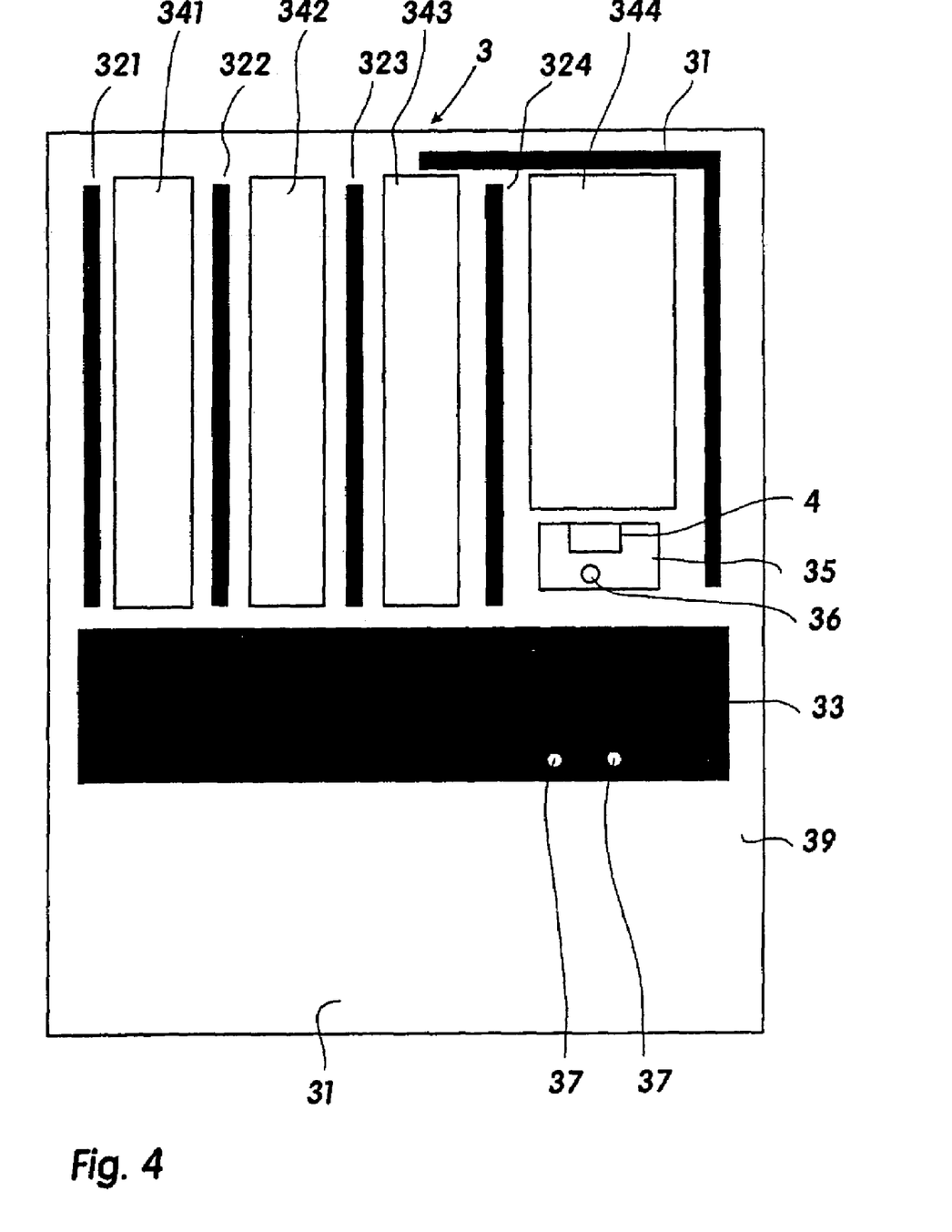
FIG. 4 shows a plan view of a coupling structure element for an antenna coupler as shown in FIG. 1.

Two preferred embodiments of the coupling structure element 2 are shown in FIG. 2 and FIG. 3. One preferred embodiment of the coupling structure element 3 is shown in FIG. 4.

Furthermore, it is also possible for the coupling structure elements 2 and 3 not to be arranged on mutually parallel planes but, for example, to have a concave or angled shape, in order to match the coupling structure elements better to the emission characteristic of the mobile radio terminal being used. Furthermore, it is also possible for this purpose to choose the distance between the coupling structure elements 2 and 3 to be different in places.

The electrical connecting element 4 produces a two-core or multicore electrical connection between the coupling structure elements 2 and 3. It is preferably formed from a base body composed of a non-conductive material in which one or more electrically conductive contact elements, which are mounted in a sprung form, are guided. The connecting element 4 is, for example, soldered at one end to conductor tracks on the coupling structure element 3, and is thus firmly connected to the coupling structure element 3. The electrically conductive contact elements of the connecting element 4 engage at the other end on appropriately shaped contact surfaces on the coupling structure element 2.

It is, of course, also possible for the electrical connecting element 4 to be formed by a cable or by one or more wire pins which, separated from one another, produce a conductive contact between conductive areas of the coupling structure elements 2 and 3.

FIG. 2 shows a view of one face of the coupling structure element 1. In this exemplary embodiment, the coupling structure element is formed by a thin, non-conductive substrate and by structure elements which are applied to this substrate and are composed of conductive material.

The coupling structure element 2 thus has a dielectric body 21 and two structure elements 22 and 23, which are formed from the conductive material and have two coupling points 24 and 25.

The dielectric body 21 is preferably a board. The material used for the dielectric body 21 is FR4 material, which has a dielectric constant of 4.5 to 6, preferably of about 4.5. Furthermore it is also possible to use a ceramic mount or RT Duroid as the substrate. The use of a ceramic mount allows the size of the coupling structure to be reduced. The thickness of the dielectric body 21 is about 0.1 to 0.5 mm. In this case, it is advantageous to make the dielectric body 21 even thinner.

The thickness of the conductive layer from which the structure elements 22 and 23 are formed is preferably 35 μm to 70 μm, but it may also be thicker or thinner. A metal, for example copper, is used as the conductive material. However, the conductive material may also be a conductive plastic.

As is shown in FIG. 2, the structure elements 22 and 23 are shaped differently and are intended for different wavelength ranges. The structure element 22 is intended for the 1800 MHz band. The structure element 23 is intended for the 900 MHz band. As can be seen from FIG. 2, the structure element 22 is oriented horizontally, and the structure element 23 is oriented vertically.

In this case, the coupling structure element 22 is in the form of a loop which is not entirely closed, whose length is about 14 mm, and whose width is about 5 mm. The width of the conductor track from which the coupling structure element 22 is formed is about 1 mm.

The coupling structure element 23 has an elongated spiral shape. The length of the spiral formed in this way is about 25 mm, and its width is about 8 mm.

FIG. 3 shows an alternative embodiment of the coupling structure elements 22 and 23.

FIG. 3 shows a coupling structure element 8 which is formed from two structure elements 82 and 83 composed of a thin conductor material and a dielectric body 81.

The structure elements 82 and 83 are differently shaped, with the structure element 82 being intended for the 1800 MHz band, and the structure element 83 being intended for the 900 MHz band. The two structure elements 82 and 83 are also oriented differently. For example, the structure element 82 is oriented vertically, and the coupling structure element 83 is oriented horizontally. The structure element 82 has a spiral shape. The structure element 83 has a meandering shape.

It is also possible for the dimensions of the structure elements 22, 23, 84 and 85 to be varied in order to match them to the frequency bands used by the mobile radio terminal, to the dielectric constants of the dielectric bodies used, and to the distance between them and the antenna of the mobile radio terminal. Furthermore, it is also possible to interchange the structure elements 22 and 82 or 23 and 83 with one another, or to couple them to one another within the respective coupling structure element itself.

FIG. 4 shows the coupling structure element 3, which is formed from a dielectric body 39 and a plurality of structure elements 321, 322, 323, 324, 31 and 33 which are composed of a thin electrically conductive material. The structure elements 321, 322, 323, 324 and 31 can be connected to the structure element 33 by means of capacitors. This allows the antenna body to be tuned to the respective mobile radio terminal. By way of example, the structure elements 321 and 31 are thus connected to the structure element 33 via capacitors (not shown in FIG. 4). Milled areas 341, 342, 343 and 344 are provided between the structure elements 321 to 324, 31 and 33. Internal milled areas such as these could also be formed on the dielectric bodies 21 and 81.

Furthermore, the dielectric body 31 has a combiner 35, which is connected to the electrical connecting element 4. The combiner 35 is used for coupling the coupling points 24 and 25 as well as 84 and 85 in FIGS. 2 and 3, respectively. The combiner 35 in this case couples the structure elements by means of capacitors or coils to a coupling point 36.

Furthermore, the structure element 33 has one or more coupling points 37. The inner conductor of the antenna cable is now connected to the coupling point 36, and the outer conductor of the antenna cable is connected to the coupling points 37.

Figure 5:
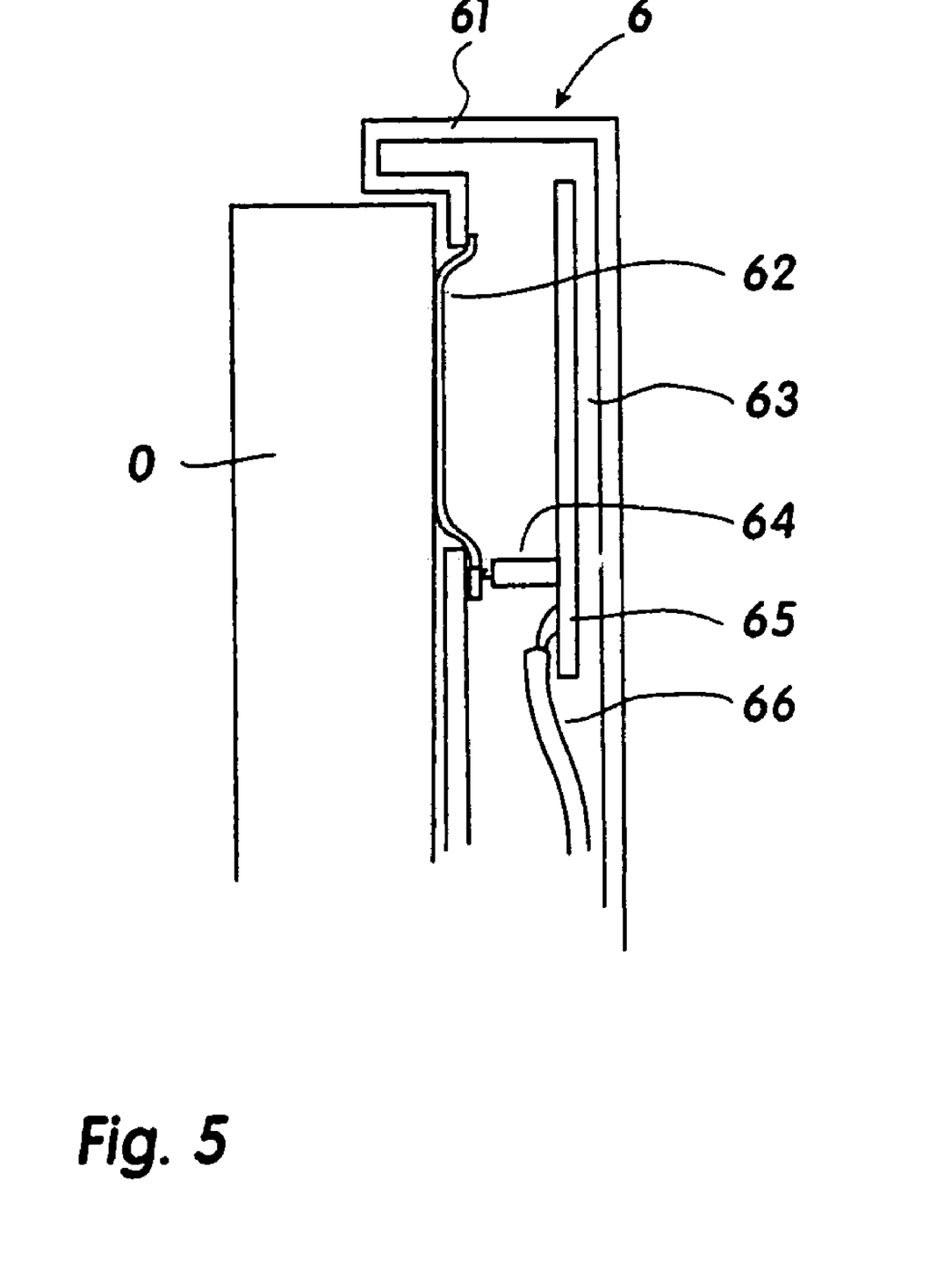
FIG. 5 shows a schematic illustration of a holder according to the invention for a mobile radio terminal according to a further exemplary embodiment of the invention.

FIG. 5 shows a schematic illustration of the mobile radio terminal 0 and a holder 6.

The holder 6 may be designed in a similar way to the holder 1 shown in FIG. 1. The holder 6 has a housing 61, two coupling structure elements 62 and 63, an electrical connecting element 64 and a connecting cable 66. The connecting cable 66 is connected at one end to an external antenna, preferably a vehicle antenna. At the other end, the connecting cable 66 is connected to an interface 65 for the coupling structure element 63. The coupling structure elements 62 and 63 as well as the electrical connecting element 64 form an antenna coupler for the mobile radio terminal 0, which has the interface 65 for connection of an external antenna.

A recess, through which the coupling structure element 62 is passed, is provided in the housing 61 in the area of the antenna of the mobile radio terminal 0. The coupling structure element 62 is formed from a thin, elastic mount substrate, to which a thin layer of conductive material is applied in order to form the coupling structure element.

The elastic mount material 62 is, for example, FR4 with a thickness of 0.5 mm. By way of example, copper or aluminum is used as the electrically conductive material. The shape of the conductive tracks of the coupling structure element 62 may correspond to that shown in FIG. 2 and FIG. 3. In addition, the coupling structure element 63 may be designed in the same way as the coupling structure element 3 shown in FIG. 4.

Figure 6:
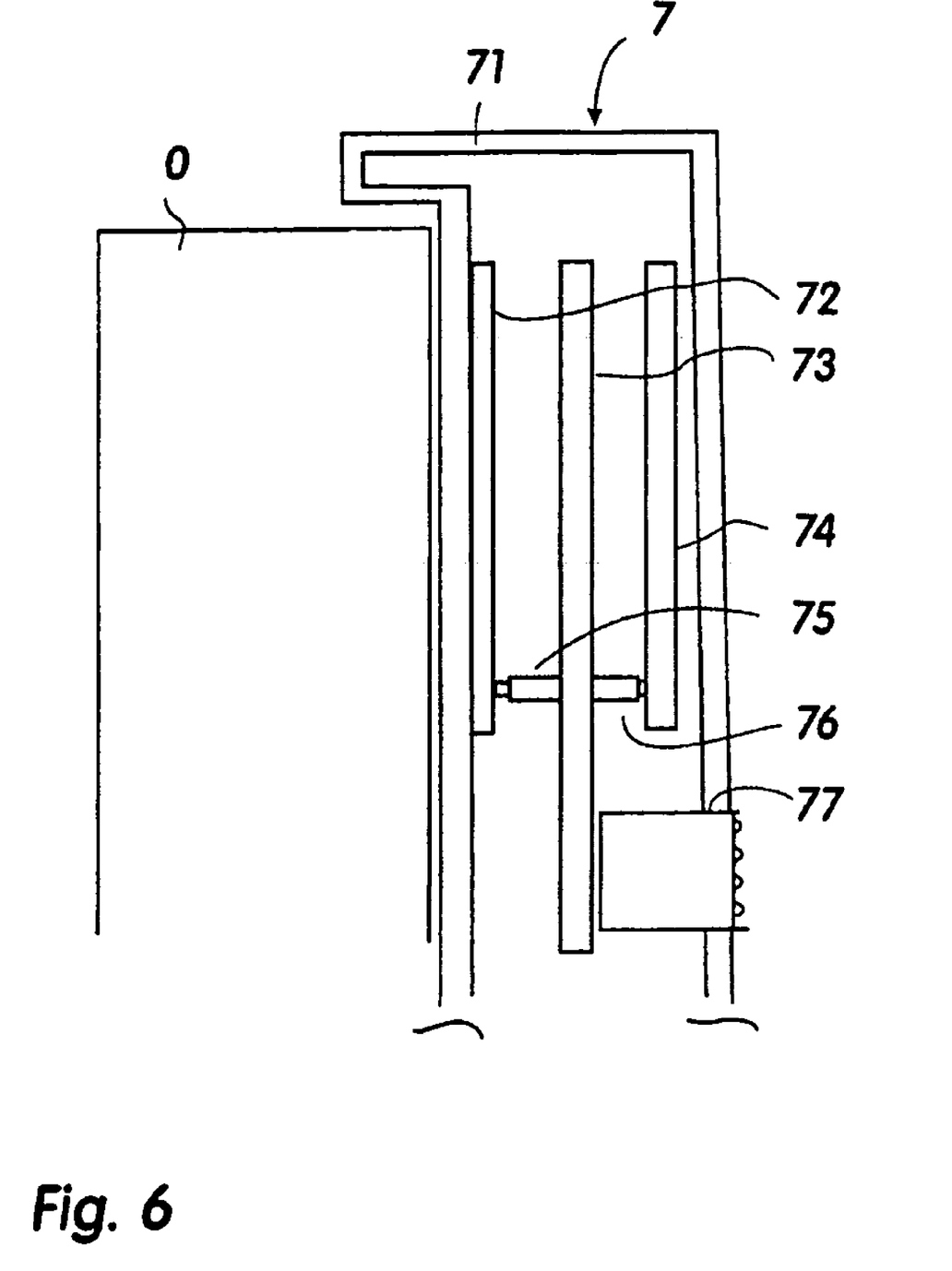
FIG. 6 shows a schematic illustration of a holder according to the invention for a mobile radio terminal according to a further exemplary embodiment of the invention.

FIG. 6 illustrates a further exemplary embodiment of the invention. FIG. 6 shows a schematic illustration of the mobile radio terminal 0 and of a holder 7. The holder 7 has the functions and mechanical refinements illustrated in the exemplary embodiment in FIG. 1. Furthermore, the holder 7 has a housing 71, three coupling structure elements 72, 73 and 74, and three electrical connecting elements 75, 76 and 77.

By way of example, the coupling structure element 72 may be designed in the same way as the coupling structure element 3 shown in FIG. 2, the coupling structure element 73 may be designed in the same way as the coupling structure element 8 shown in FIG. 3, and the coupling structure element 74 may be designed in the same way as the coupling structure element 3 shown in FIG. 4, with the difference that the combiner 35 and the coupling points 36 and 37 for connection of the external antenna are arranged on the dielectric body of the coupling structure 73.

Furthermore, it is also possible for the coupling structures 72 and 73 each to have only one structure element, for example one of the structure elements shown in FIG. 2 or 3.

The electrical connecting elements 75 and 76 are formed in the same way as the electrical connecting element 4 shown in FIG. 1. The electrical connecting elements 75 and 76 are in this case preferably soldered to conductive areas of the coupling structure 73 and engage on correspondingly shaped contact surfaces of the coupling structures 72 and 74 with contact pins which are mounted in a spun manner. The coupling structure 72 is arranged on the inner face of the housing 71 in the immediate vicinity of the antenna of the mobile radio terminal 0, and is adhesively bonded to the inside of the housing. The coupling structure 72 is in this case preferably formed from a foil element into which an appropriately shaped electrically conductive structure is introduced, and which has an adhesive bonding surface for connection to the inner face of the housing 72.

The electrical connecting element 77 is composed of a plug element with a plurality of contact pins which are mounted in a sprung form and are guided in a common body composed of a non-conductive material. In addition to connection of the external antenna, the electrical connecting element 77 is also used for the connection of AF signals and for the power supply.

The invention claimed is:

1. A holder for a mobile radio terminal, comprising:
a holder having an interface for connecting to an external antenna, and a coupling structure for electromagnetic coupling of RF signals between the holder and the external antenna of the mobile radio terminal which is located in the holder;
the coupling structure being arranged in the holder in such a way that, when the mobile radio terminal is inserted, the coupling structure is positioned underneath the mobile radio terminal in the vicinity of a mobile radio;
wherein the coupling structure is in the form of a two-layer or multilayer coupling structure with two or more coupling structure elements arranged one above the other on essentially mutually parallel planes, in which the two or more coupling structure elements are arranged one above the other and separated from one another by three to six millimeters, whereby a first coupling structure element comprises two differently shaped structure elements which are for different wavelength ranges;
wherein the first coupling structure element has two or more structure elements whose orientation directions are rotated through 90°.

2. The holder of claim 1, wherein the antenna is a motor vehicle antenna.

3. The holder as claimed in claim 1, wherein a second coupling structure element comprises two or more differently shaped structure elements which are coupled to one another.

4. The holder as claimed in claim 1, wherein one coupling structure element is in each case composed of a conductive material which is applied to one face of a mount substrate.

5. The holder of claim 4, wherein the mount substrate is a board.

6. The holder as claimed in claim 4, wherein two or more structure elements composed of a conductive material are applied to the mount substrate and can be connected to one another for tuning.

7. The holder as claimed in claim 6, wherein the structure elements are connected to one an other by means of capacitors or coils.

8. The holder as claimed in claim 1, wherein the two or more coupling structure elements are each composed of a conductive material which is applied to a respectively associated thin dielectric mount substrate body and the dielectric mount substrate bodies are arranged one above the other, at a distance from one another.

9. The holder as claimed in claim 8, wherein the holder has one or more electrical connection elements which are arranged between mount substrate bodies.

10. The holder as claimed in claim 9, wherein one electrical connection element has one or more electrically conductive contact elements which are mounted in a sprung form and engage on correspondingly shaped contact surfaces.

11. The holder as claimed in claim 8, wherein an RF coupling element for coupling two or more structure elements which are applied to a second mount substrate body is arranged on a first mount substrate body.

12. The holder as claimed in claim 8, wherein the mount substrate body is composed of a flexible material.

13. The holder as claimed in claim 8, wherein the mount substrate body has one or more internal milled areas which are arranged between the conductor surfaces of coupling structure elements.

* * * * *